United States Patent
Jim

(10) Patent No.: US 6,822,813 B2
(45) Date of Patent: Nov. 23, 2004

(54) RETRACTABLE MAGNIFIER WITH AN ELECTRIC LAMP

(75) Inventor: Shiu-fai Jim, Hong Kong (CN)

(73) Assignee: Concavex Plastic Works Limited, Hong Kong (CN)

( * ) Notice: Subject to any disclaimer, the term of this patent is extended or adjusted under 35 U.S.C. 154(b) by 0 days.

(21) Appl. No.: 10/700,038

(22) Filed: Nov. 3, 2003

(65) Prior Publication Data

US 2004/0207935 A1 Oct. 21, 2004

(30) Foreign Application Priority Data

Apr. 16, 2003  (CN) ........................................ 03244042 U

(51) Int. Cl.[7] .............................................. G02B 27/02
(52) U.S. Cl. ........................ 359/802; 359/813; 359/817
(58) Field of Search ........................ 359/440–42, 802–5, 359/808–13, 815, 817, 819, 822

(56) References Cited

U.S. PATENT DOCUMENTS 5,267,716 A * 12/1993 Friedman ................. 248/291.1
5,515,201 A * 5/1996 Omi ............................. 359/385
5,754,349 A * 5/1998 Hon ............................. 359/813

* cited by examiner

Primary Examiner—Jordan M. Schwartz
Assistant Examiner—Jessica Stultz
(74) Attorney, Agent, or Firm—Alix, Yale & Ristas, LLP

(57) ABSTRACT

A retractable magnifier includes a housing and a lens assembly having a lens carried in a frame. The lens assembly is movable in the housing between a retracted position and an extended position. The housing is provided with pushbuttons capable of releasing the lens assembly from the retracted position. A longitudinal rack is formed in the housing. A pinion meshes the rack and has a spindle rotatably connected to the frame. The pinion further includes a helical torsion spring mounted around the spindle and placed in damping oil for urging the pinion in such a direction that the frame may be moved, in a gentle manner, to the extended position. A rocker provided with an electric prefocus lamp is pivotally connected to the housing, and adapted to be pivoted outward at a predetermined angle with the housing when the lens assembly is in the extended position. A switch is formed on the housing for turning on/off the lamp.

10 Claims, 7 Drawing Sheets

RETRACTABLE MAGNIFIER WITH AN ELECTRIC LAMP

FIELD OF THE INVENTION

The present invention relates to a magnifier and, more particularly, to a retractable magnifier with an electric lamp.

BACKGROUND OF THE INVENTION

It is well known that magnifiers are useful tools for observe small objects or for relieving the eyestrain during the observation. A magnifier that has a lens retractable into a protective housing is disclosed, such as in U.S. Pat. No. 5,754,349, which is a retractable magnifier provided with a protective housing and an additional lamp. Although such a magnifier can be operated with a single hand, it still has some shortcomings as follows:

The lamp can not function anymore once a lens of the magnifier is fully retracted into the housing.

Even if the lens is extended out, there is only a fraction of light that can be out of the housing through a window. This fraction of light then travels in a direction substantially transverse to the housing and so the object to be observed can not be illuminated properly.

Because the lens is carried in a frame which is moved directly by the action of two springs, the frame and the lens are moved at a rapid speed immediately after they are actuated to extend out of the housing, thus resulting in a significant impact upon associated stop elements and a shortened life of the magnifier.

In this magnifier, there is no proper guide for the movement of the frame. Because it is impossible either for the two springs to exert absolutely equal action to the frame or for the two push-buttons to be depressed at the exactly same time, the frame may be jammed in the housing if one of its opposite side is moved to precede the other.

OBJECTS OF THE INVENTION

It is an object of the present invention to provide a retractable magnifier which may overcome the shortcomings of the prior art. Another object of the present invention is to provide a retractable magnifier in which a lens assembly may be extended out and retracted in smoothly.

Yet another object of the present invention is to provide a retractable magnifier in which a lens assembly may be extended out slowly and gently.

Still another object of the present invention is to provide a retractable magnifier in which a lamp functions effectively.

SUMMARY OF THE INVENTION

To achieve the aforementioned objects, the present invention provides a retractable magnifier comprising a housing and a lens assembly having a lens carried in a frame. The lens assembly is movable in the housing between a retracted position and an extended position. The housing is provided with push-buttons capable of releasing the lens assembly from the retracted position. A longitudinal rack is formed in the housing. A pinion meshes the rack and has a spindle rotatably connected to the frame. The pinion further includes a helical torsion spring mounted around the spindle and placed in damping oil for urging the pinion in such a direction that the frame may be moved, in a gentle manner, to the extended position. A rocker provided with an electric prefocus lamp is pivotally connected to the housing, and adapted to be pivoted outward at a predetermined angle with the housing when the lens assembly is in the extended position. A switch is formed on the housing for turning on/off the lamp.

As an aspect of the present invention, the rack and the pinion are made of plastic.

In a highly preferred embodiment, the housing has a pair of spaced tabs formed therein, and the rocker has a shaft rotatably connected to the spaced tabs.

The rocker and the shaft made be made of plastic into an integral configuration.

The rocker and the shaft may also be made separately of plastic and then attached to each other, and the rocker may be is spring-loaded so as to tend to be pivoted inward and orientated at a substantially zero angle with the housing.

As another aspect of the present invention, the frame of the lens assembly has an inner end formed with a protrusion, and the protrusion is configured to pivot the rocker outward through the predetermined angle when the lens assembly is moved to the extended position.

Additionally, the electric prefocus lamp may be a small, electric prefocus bulb or, alternatively, may be a light emitting diode.

As still another aspect of the present invention, the retractable magnifier further comprises at least one battery received in the housing.

As yet another aspect of the present invention, the retractable magnifier further comprises an internal plastic casing filled with the damping oil, and the helical torsion spring is placed in the damping oil.

Other objects, advantages and novel features of the this invention will become more apparent from the following detailed description when taken in conjunction with the accompanying drawings.

BRIEF DESCRIPTION OF THE DRAWINGS

FIGS. 2A-F are views of the inventive retractable magnifier with the lens in the retracted position, wherein FIG. 2A is a front view, FIG. 2B is a back view, FIG. 2C is a left view, FIG. 2D is a right view, FIG. 2E is a top view and FIG. 2F is a bottom view;

FIGS. 3A~F are views of the inventive retractable magnifier with the lens in the extended position, wherein FIG. 3A is a front view, FIG. 3B is a back view, FIG. 3C is a left view, FIG. 3D is a right view, FIG. 3E is a top view and FIG. 3F is a bottom view;

DETAILED DESCRIPTION OF THE PREFERRED EMBODIMENT

Figure 1:
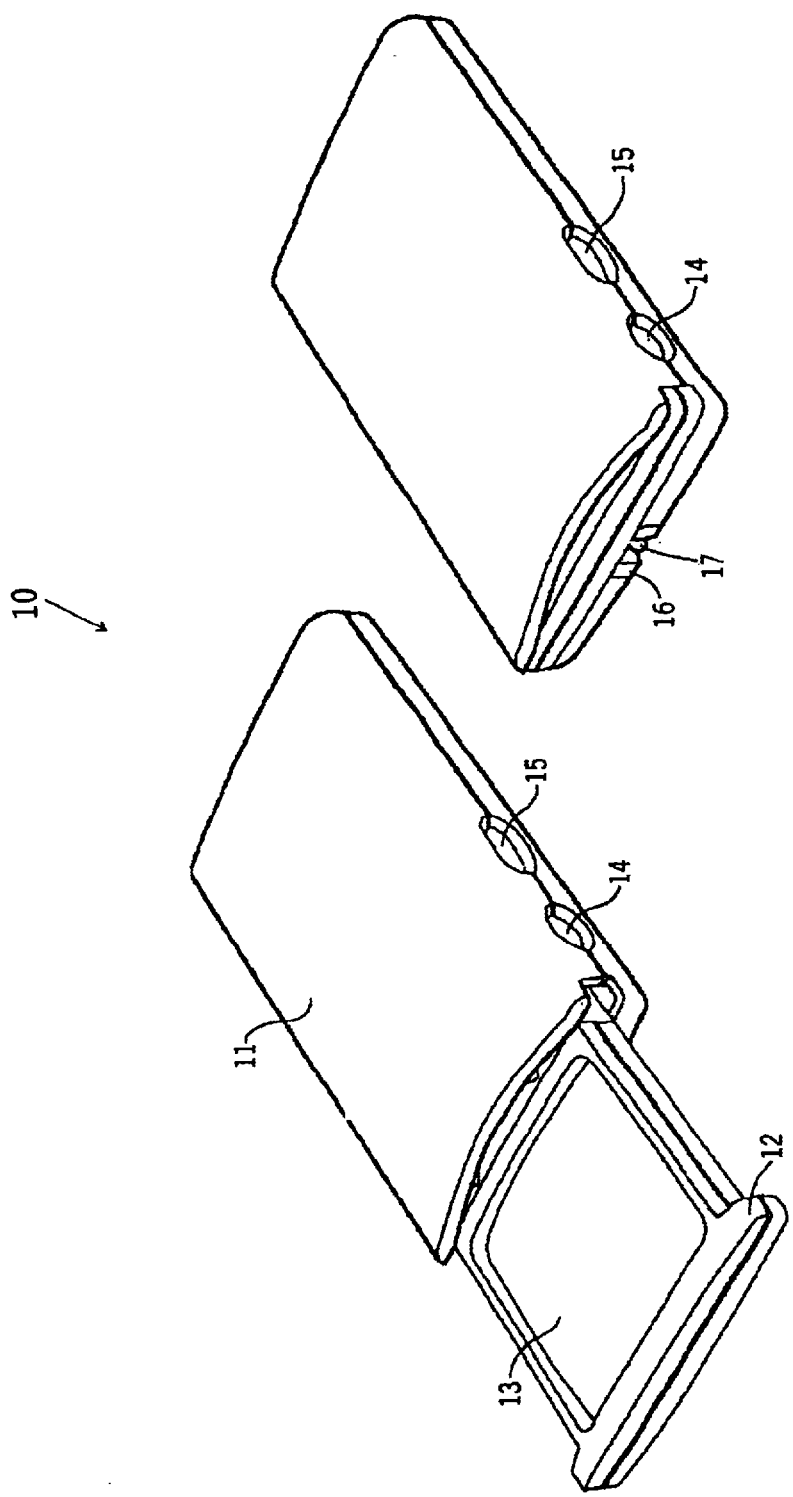
FIGS. 1A and B are perspective views of a retractable magnifier in accordance with the present invention, showing a lens assembly in an extended position and a retracted position, respectively.
Figure 2:
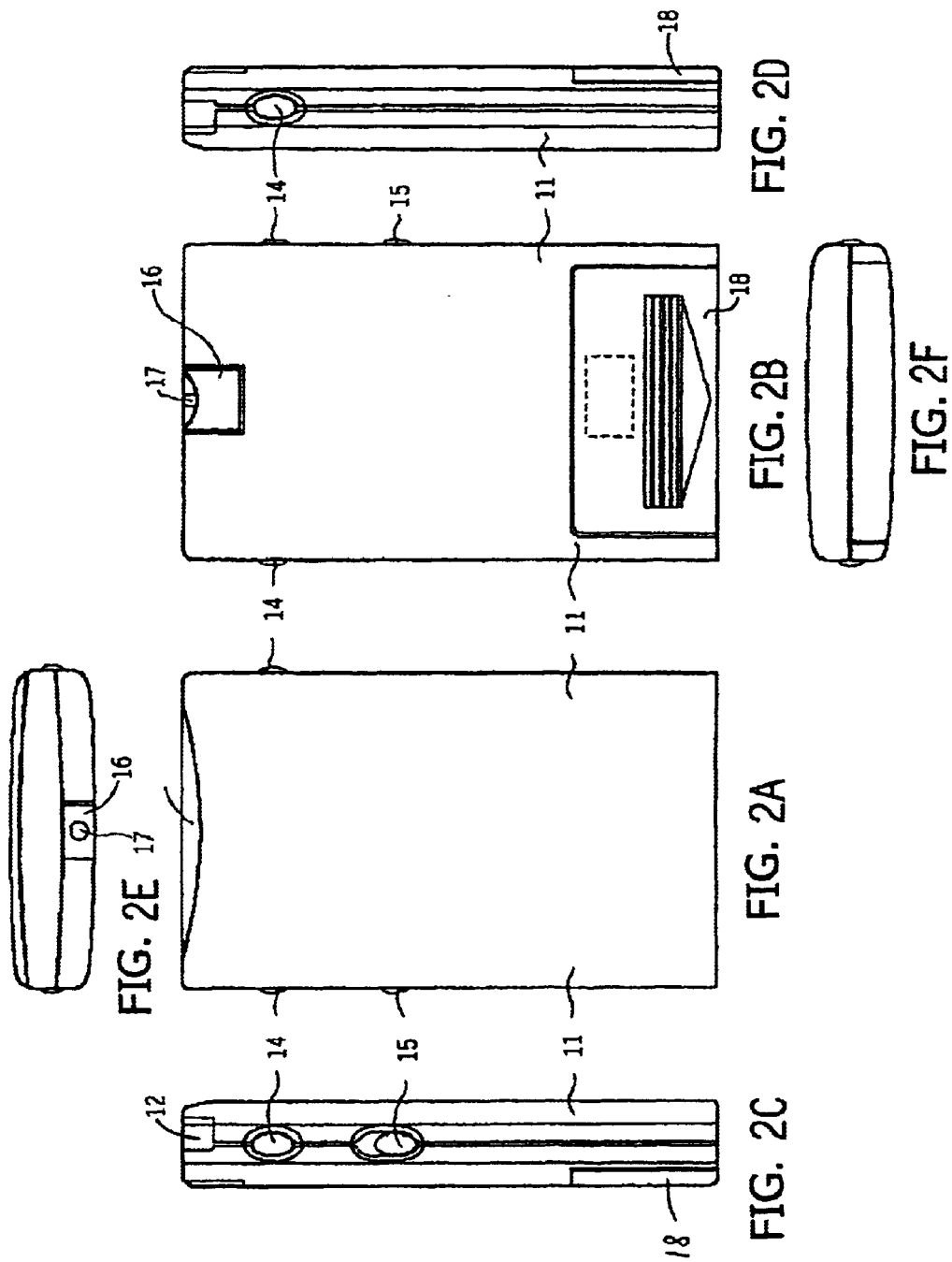
Figure 3:
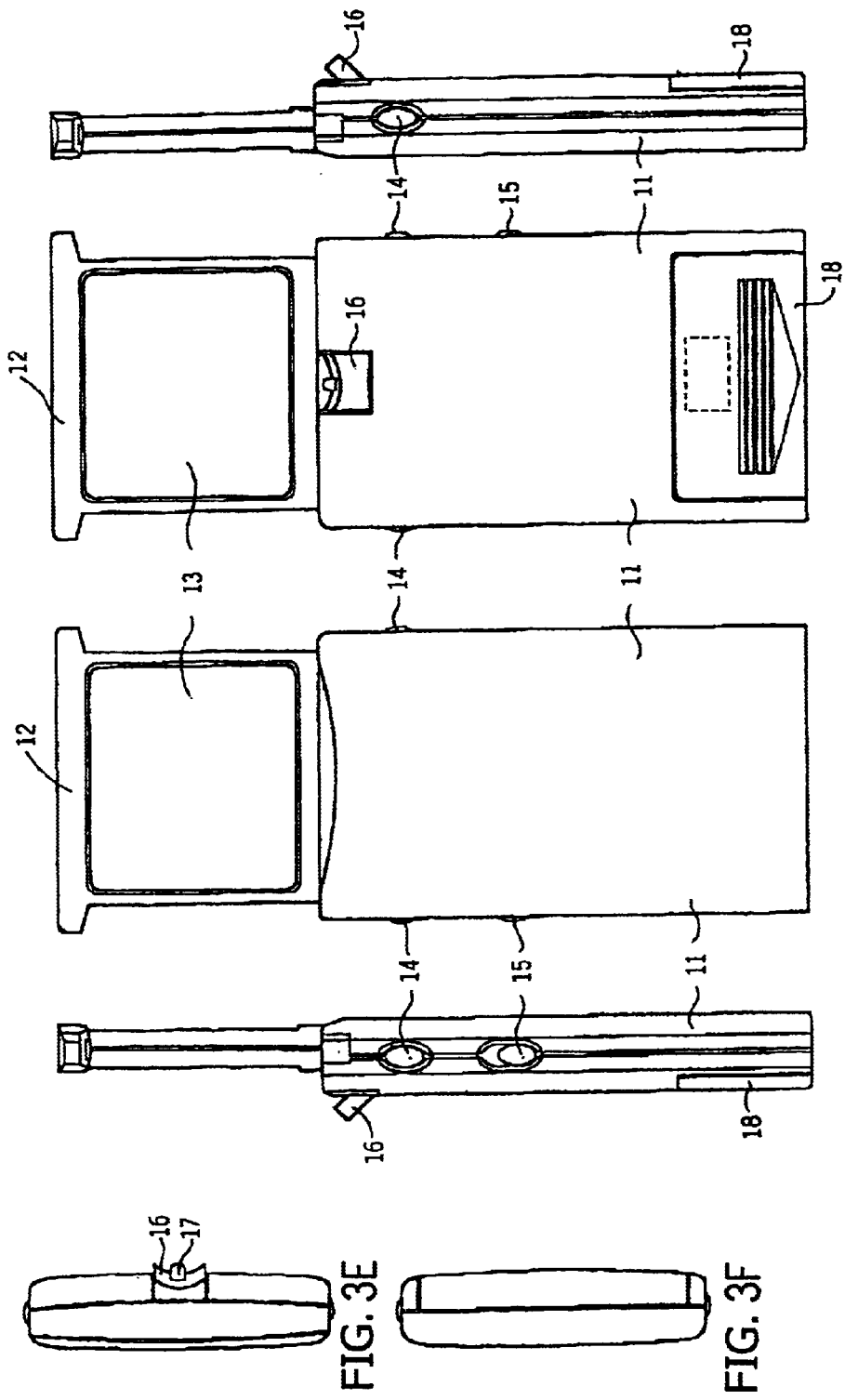

FIGS. 1A and B are respective perspective views of a retractable magnifier 10 in accordance with the present invention, with FIG. A showing a lens 13 extended out and FIG. B showing the lens 13 retracted in. As can be seen, the retractable magnifier 10 includes a housing 11 preferably consisting of two halves, and a lens assembly (not numbered) having a frame 12 carrying the lens 13. The lens assembly is movable in the housing 11 between a retracted position, in which the lens 13 is received in the housing 11, as illustrated in FIG. 1A, and an extended position, in which the lens 13 is fully extended out of the housing 11, as illustrated in FIG. 1B.

Referring to FIGS. 2A~F and 3A~F, the housing 11 is provided on its sides with a pair of opposed push-buttons 14 which, as those in the prior art, can release the lens assembly from the retracted position and allow the same assembly to be moved from the retracted position to the extended position when the push-buttons 14 are depressed.

Also formed on one of the sides of the housing 11 is a slide switch 15 for turning on/off an electric prefocus lamp 17 carried on a rocker 16. Numeral 18 denotes a cover 18 for a battery compartment defined in the housing 11.

Figure 4:
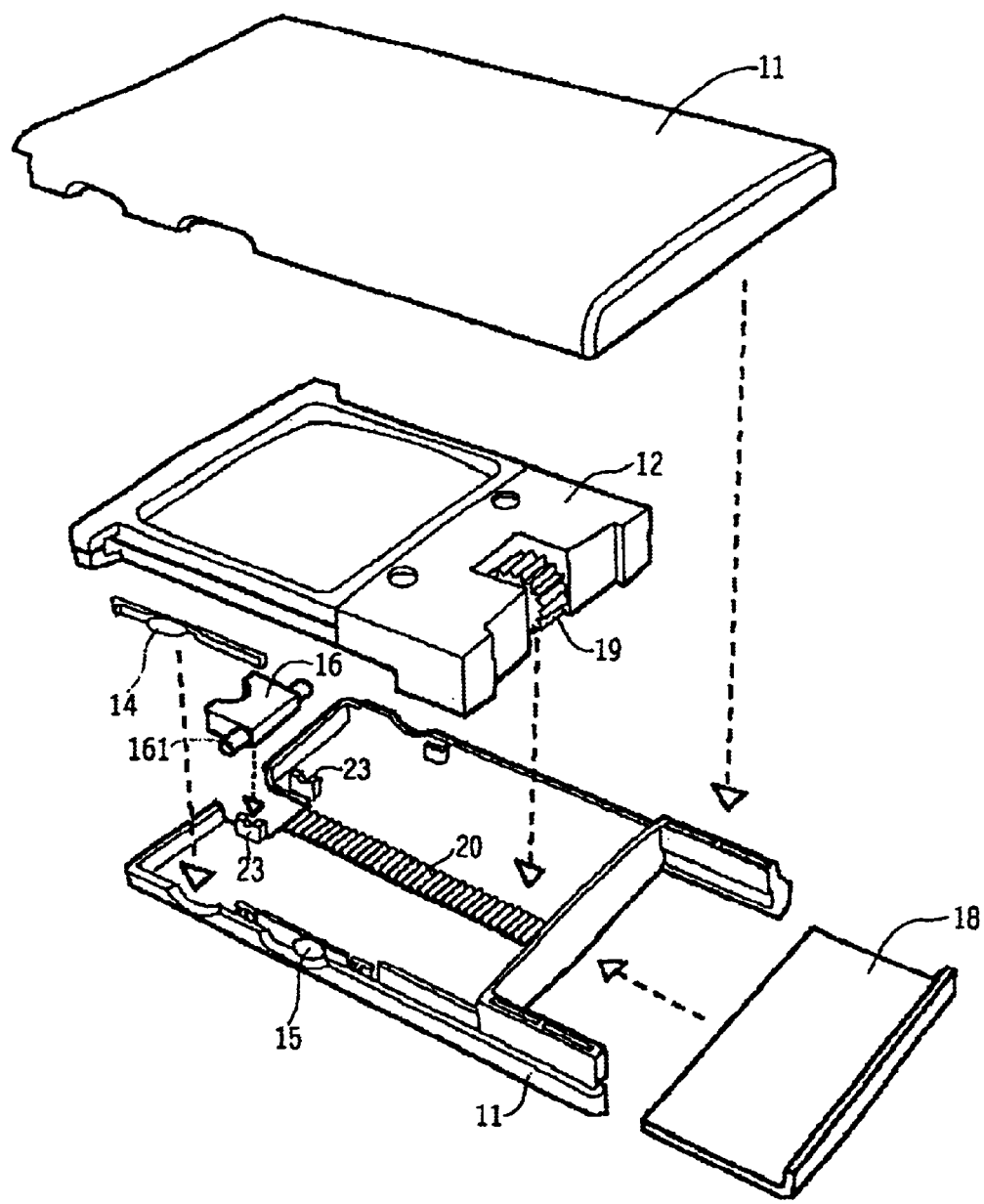
FIG. 4 is an exploded perspective view of the inventive magnifier 10.

FIG. 4 is an exploded perspective view of the retractable magnifier 10, with the housing 11 disassembled and the cover 18 removed. As clearly shown, the inventive magnifier 10 includes a pinion 19 which meshes a longitudinal rack 20 integrally formed on an inner surface of the housing 11. Preferably, the pinion 19 and the rack 20 are made of plastic.

Figure 7D:
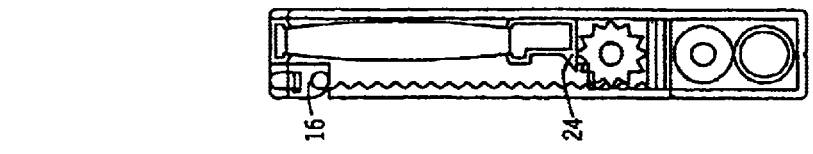
FIGS. 7A~D are back and side views of the inventive magnifier, showing the lens assembly in its extended position and its retracted position, respectively.
Figure 7C:
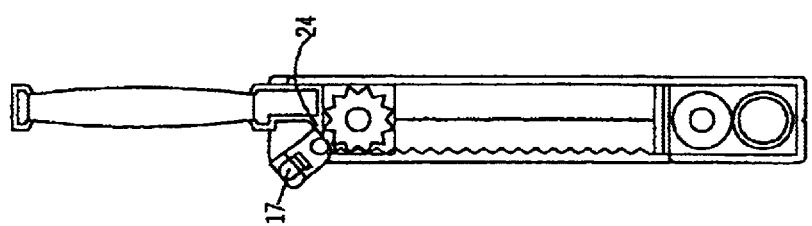
Figure 7B:
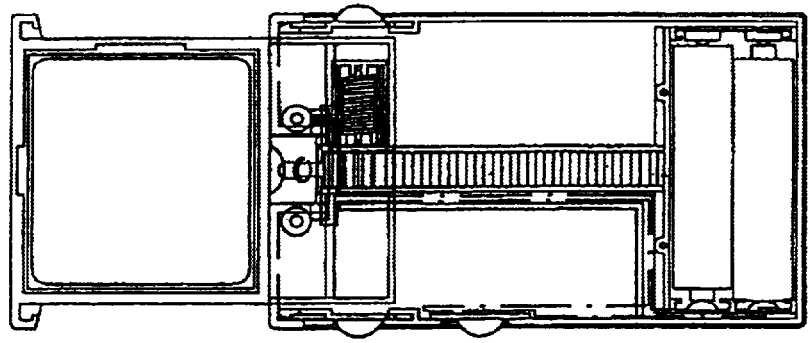
Figure 7A:
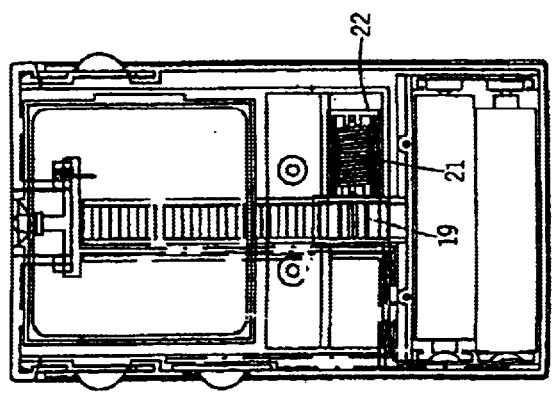

Referring to FIGS. 7A and B, the pinion 19 has a spindle (not numbered) rotatably connected to the frame 12, and has a helical torsion spring 21 mounted around the spindle to urge the pinion 19 in such a rotation direction that the frame 12 tends to be moved form its retracted position, as shown in FIG. 7A, to its extended position, as shown in FIG. 7B. The torsion spring 21 is additionally enclosed by an internal plastic casing 22 filled with damping oil, which has a coefficient of viscosity sufficient to relieve the bursting-out action of the spring 21 exerted on the frame 12 when the push-buttons 14 are depressed, as well as to prevent the spring 21 placed in the oil from rusting. This causes the lens assembly to be moved out of the housing 11 more slowly and gently than one in the prior art.

The rack 20, together with the pinion 19, also serves as a guide that ensures the parallel relationship between the frame 12 and the housing 11, thus preventing the lens assembly from being accidentally jammed in the housing 11 even if the two push-buttons 14 are not depressed at the exactly same time. Furthermore, the extended position of the lens assembly may optionally be defined by the dead point where the pinion 19 stops rolling on the rack 20.

Referring back to FIG. 4, the rocker 16, preferably made of plastic, is pivotally connected to a front end of the housing 11 and is spring-loaded in such a way that it tends to be pivoted inward and orientated at a substantially zero angle with the housing 11, as shown in FIG. 4. The rocker 16 may have a shaft 161 made of plastic, and the shaft 161 may be formed integrally with the rocker 16 or, alternatively, be made separately from the rocker 16 and then attached thereto. In a highly preferred embodiment, the shaft 161 is pivotally connected to a pair of spaced internal tabs 23 of the housing 11 in a manner that allows the shaft 161 to be pivotally connected to the tabs 23 without any risk of escaping, such as in the manner as shown in FIG. 5B.

Figure 5A:
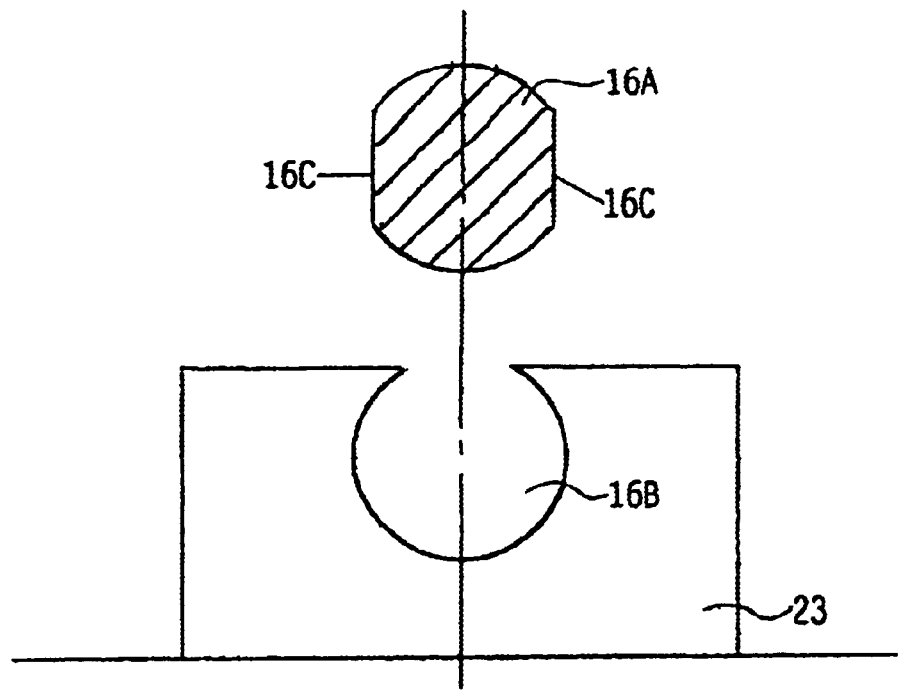
FIGS. 5A and B are schematic views showing a shaft of a rocker included in the inventive magnifier before and after necks of the shaft are put into top-opened openings of tabs.
Figure 5B:
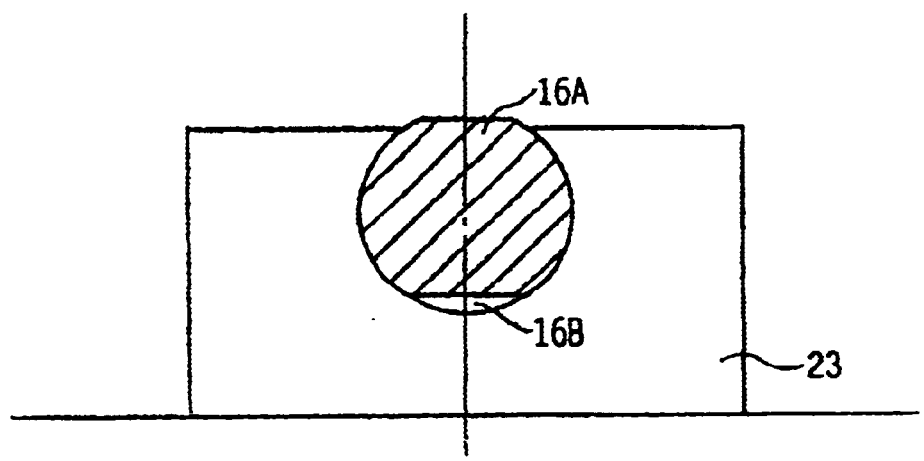

FIGS. 5A and B show schematic views of an exemplary embodiment of the shaft 161 before and after its necks 16A are put into top-opened openings 16B of the tabs 23, respectively. In this embodiment, each of the necks 16A has a pair of opposed cutouts 16C formed thereon, thereby allowing the shaft 161 of the rocker 16 to be pivotal relative to the tabs 23 without risk of escaping therefrom immediately after the necks 16A has been put into the openings 16B and the shaft 16 has been turned a certain degree with respect to the tabs 23.

Figure 6:
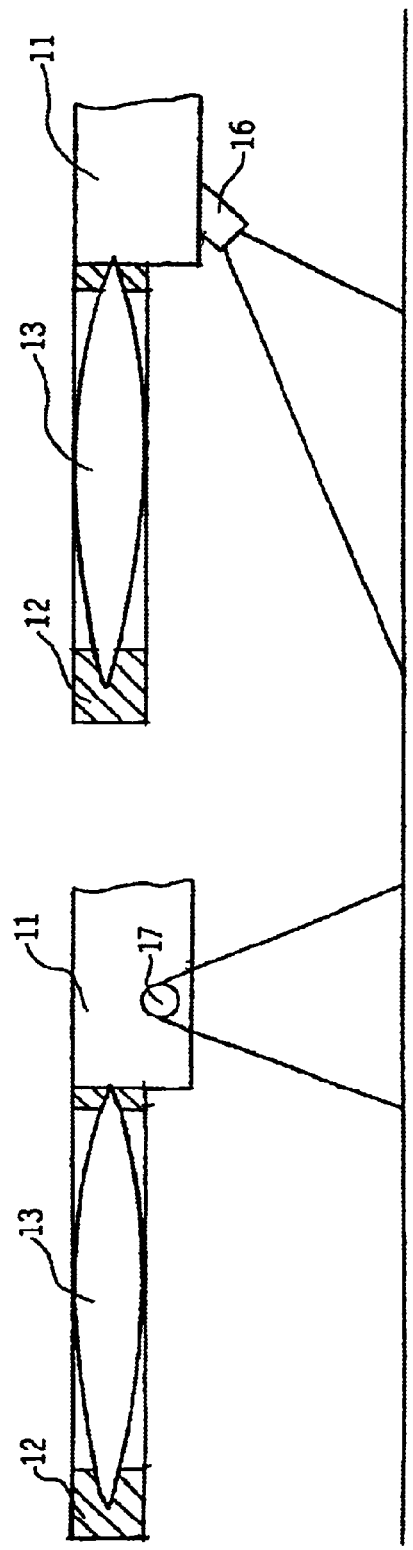
FIG. 6 is a schematic view illustrating the difference between respective illuminated areas produced by the inventive magnifier 10 and the prior art.

FIG. 6 is a schematic view illustrating the difference between respective illuminated areas produced by the inventive magnifier 10 and the prior art. The prior art magnifier, shown on the left-hand side of FIG. 6, produces a illuminated area behind the extended-out lens 13 solely by the diffused light from the side of its lamp 17, while the inventive magnifier 10, shown on the right-hand side of FIG. 6, produces a illuminated area covering the same area as to be observed with the lens 13, just by the pre-focused main light from the front end of the electric pre-focus lamp 17 thereof.

Moreover, the prior art magnifier is made into a configuration that imposes a limitation in use of any pre-focus lamp. However, the inventive magnifier 10 has a configuration imposing no such limitation and thus can be provided with either a non-prefocus lamp 17 as used in the prior art, or a small electric prefocus bulb, or even an LED (light emitting diode).

In an alternative embodiment, the rocker 16 may have a shaft 161 made separately from instead of formed integrally with the rocker 16, and the shaft 161 may be pivotally connected to spaced tabs 23 of the housing 11 in any manner that can prevent the necks from escaping from the tabs 23 after being putted therein.

Referring to FIG. 7C, whenever the lens assembly is moved to its extended position, the rocker 16 will be pivoted outward and orientated at a predetermined angle with the housing 11 by a protrusion 24 formed on an inner end of the frame 12, so as to direct the lamp 17 towards the object to be observe. However, the predetermined angle is determined, such as by the magnification of the lens 13 and the projecting angle of light emitted by the lamp 17, since the distance between the lens 13 and the object varies depending upon the magnification, and the illuminated area at the given distance, upon the projecting angle of light.

Whenever the lens assembly is moved towards its retracted position, the production 24 of the frame 12 is moved away from the rocker 16, which then returns to its original position, as shown in FIG. 7D, under the spring-loading action. At the time when the lens assembly is in the retracted, the lamp 17 may illuminate frontward if required.

The inventive magnifier 10 further includes a circuitry having a plurality elements, including batteries received in the housing 11, contacts for the batteries, the slide switch 15, and wires for electrically connecting the elements. Because all these elements are well known in the art, no detailed description on them will be made.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A retractable magnifier with an electric lamp, comprising:

a housing;

a lens assembly having a frame and a lens carried in said frame, said lens assembly being movable in said housing between a retracted position in which said lens is received in said housing and an extended position in which said lens is fully extended out of said housing;

said housing being provided with a pair of opposed push-buttons capable of releasing said lens assembly from said retracted position and allowing said lens assembly to be moved from said retracted position to said extended position when said push-buttons are depressed;

a longitudinal rack formed on an inner surface of said housing;

a pinion meshing said rack and having a spindle rotatably connected to said frame of said lens assembly;

said pinion having a helical torsion spring mounted around said spindle for urging said pinion in such a rotation direction that said frame may tend to be moved from said retracted position to said extended position, said helical torsion spring being placed in damping oil;

a rocker pivotally connected to said housing and provided with an electric prefocus lamp, said rocker being adapted to be pivoted outward and oriented at a predetermined angle with said housing when said lens assembly is in said extended position; and a switch formed on said housing for turning on and off said electric prefocus lamp.

2. The retractable magnifier as claimed in claim 1, wherein said rack and said pinion are made of plastic.

3. The retractable magnifier as claimed in claim 1, wherein said housing has a pair of spaced tabs formed therein, and wherein said rocker has a shaft rotatably connected to said spaced tabs.

4. The retractable magnifier as claimed in claim 3, wherein said rocker and said shaft are made of plastic into an integral configuration.

5. The retractable magnifier as claimed in claim 3, wherein said rocker and said shaft are made separately of plastic and then attached to each other, and wherein said rocker is spring-loaded so as to tend to be pivoted inward and orientated at a substantially zero angle with said housing.

6. The retractable magnifier as claimed in claim 1, wherein said frame of said lens assembly has an inner end formed with a protrusion, and wherein said protrusion is configured to pivot said rocker outward through said predetermined angle when said lens assembly is moved to said extended position.

7. The retractable magnifier as claimed in claim 1, wherein said electric prefocus lamp is a small, electric prefocus bulb.

8. The retractable magnifier as claimed in claim 1, wherein said electric prefocus lamp is a light emitting diode.

9. The retractable magnifier as claimed in claim 1 further comprising at least one battery received in said housing.

10. The retractable magnifier as claimed in claim 1 further comprising an internal plastic casing filled with said damping oil, and wherein said helical torsion spring is placed in said damping oil.

* * * * *